(12) United States Patent
Bradley

(10) Patent No.: US 8,926,780 B2
(45) Date of Patent: Jan. 6, 2015

(54) CAVITY SEALING ASSEMBLY

(75) Inventor: Jeffery A. Bradley, Imlay City, MI (US)

(73) Assignee: Zephyros, Inc., Romeo, MI (US)

( * ) Notice: Subject to any disclaimer, the term of this patent is extended or adjusted under 35 U.S.C. 154(b) by 274 days.

(21) Appl. No.: 13/525,462

(22) Filed: Jun. 18, 2012

(65) Prior Publication Data

US 2012/0318452 A1    Dec. 20, 2012

Related U.S. Application Data

(60) Provisional application No. 61/498,332, filed on Jun. 17, 2011.

(51) Int. Cl.
| | | |
|---|---|---|
| *B32B 38/04* | (2006.01) | |
| *B60R 13/08* | (2006.01) | |
| *B29C 44/18* | (2006.01) | |
| *B29C 44/12* | (2006.01) | |
| *B62D 25/00* | (2006.01) | |
| *B62D 29/00* | (2006.01) | |
| *B62D 25/02* | (2006.01) | |

(52) U.S. Cl.
CPC ................ *B60R 13/08* (2013.01); *B32B 38/04* (2013.01); *B29C 44/18* (2013.01); *B29C 44/1271* (2013.01); *B29C 44/186* (2013.01); *B62D 25/00* (2013.01); *B62D 29/002* (2013.01); *B62D 25/025* (2013.01)
USPC ............................ 156/256; 156/250; 156/258

(58) Field of Classification Search
CPC .... B38B 38/04; B29C 44/1271; B29C 44/18; B29C 44/186; B62D 25/00; B62D 25/025; B62D 29/002; B60R 13/08
USPC ........................................ 156/250, 256, 258
See application file for complete search history.

(56) References Cited

U.S. PATENT DOCUMENTS

| | | | |
|---|---|---|---|
| 5,575,526 | A | 11/1996 | Wycech |
| 5,755,486 | A | 5/1998 | Wycech |
| 5,766,719 | A | 6/1998 | Rimkus |
| 5,932,680 | A | 8/1999 | Heider |
| 6,131,897 | A | 10/2000 | Barz et al. |
| 8,028,799 | B2 | 10/2011 | Hasler |
| 8,079,442 | B2 | 12/2011 | Wojtowicki |
| 8,087,916 | B2 | 1/2012 | Kanie et al. |
| 8,293,360 | B2 | 10/2012 | Cousin |
| 8,388,037 | B2 | 3/2013 | LaNore et al. |

(Continued)

FOREIGN PATENT DOCUMENTS

| | | | |
|---|---|---|---|
| EP | 1593587 A2 | 11/2005 | |
| EP | 2097308 B1 | 9/2009 | |

(Continued)

OTHER PUBLICATIONS

International Search Report and Written Opinion dated Apr. 29, 2013; Application No. PCT/US2012/042866.

(Continued)

*Primary Examiner* — Mark A Osele
*Assistant Examiner* — Christopher C Caillouet
(74) *Attorney, Agent, or Firm* — The Dobrusin Law Firm, PC

(57) ABSTRACT

A method for reinforcing, baffling or sealing a vehicle structure by providing a die-cut expandable material that enters and seals a cavity or multiple cavities and corners, cracks, or seams.

20 Claims, 3 Drawing Sheets

(56) References Cited

U.S. PATENT DOCUMENTS

| | | |
|---|---|---|
| 8,444,214 B2 | 5/2013 | Helferty et al. |
| 8,469,143 B2 | 6/2013 | Prunarety et al. |
| 2004/0011282 A1 | 1/2004 | Myers et al. |
| 2004/0076831 A1 | 4/2004 | Hable et al. |
| 2005/0249916 A1* | 11/2005 | Muto et al. .................... 428/131 |
| 2005/0260399 A1 | 11/2005 | Finerman |
| 2005/0268454 A1 | 12/2005 | White |
| 2006/0073266 A1 | 4/2006 | Myers et al. |
| 2009/0001758 A1 | 1/2009 | Hanley, IV et al. |
| 2009/0111371 A1 | 4/2009 | Niezur et al. |
| 2010/0021267 A1 | 1/2010 | Nitsche |
| 2010/0253004 A1 | 10/2010 | Lehmann |
| 2010/0259059 A1 | 10/2010 | Quaderer |
| 2010/0320028 A1 | 12/2010 | Wojtowicki |
| 2011/0057392 A1 | 3/2011 | Monnet et al. |
| 2011/0109003 A1 | 5/2011 | LaNore et al. |
| 2011/0189428 A1 | 8/2011 | Belpaire et al. |
| 2011/0192675 A1 | 8/2011 | Lecroart et al. |
| 2012/0207986 A1 | 8/2012 | Belpaire et al. |
| 2012/0295093 A1 | 11/2012 | Belpaire et al. |
| 2013/0087406 A1 | 4/2013 | Franey |
| 2013/0140731 A1 | 6/2013 | Belpaire |
| 2013/0181470 A1 | 7/2013 | LaNore et al. |

FOREIGN PATENT DOCUMENTS

| | | |
|---|---|---|
| EP | 2134799 A1 | 12/2009 |
| EP | 2236358 B1 | 6/2010 |
| EP | 2242634 A1 | 10/2010 |
| EP | 2176113 B1 | 4/2011 |
| EP | 2330019 A1 | 8/2011 |
| EP | 2360002 A1 | 8/2011 |
| EP | 2390077 A1 | 11/2011 |
| EP | 2507116 A1 | 10/2012 |
| EP | 2533961 A1 | 12/2012 |
| EP | 2576176 A1 | 4/2013 |
| EP | 1534561 B1 | 8/2013 |
| EP | 2262633 B1 | 9/2013 |
| WO | 2008/014250 A1 | 1/2008 |
| WO | 2011/134943 A1 | 11/2011 |
| WO | 2011/147872 A1 | 12/2011 |

OTHER PUBLICATIONS

International Preliminary Report on Patentability dated Sep. 9, 2013; Application No. PCT/US2012/042866.

* cited by examiner

CAVITY SEALING ASSEMBLY

CLAIM OF PRIORITY

The present application claims the benefit of the priority of U.S. Provisional Application Ser. No. 61/498,332 filed Jun. 17, 2011, the contents of which are incorporated by reference herein.

TECHNICAL FIELD

The present invention relates generally to a baffling, sealing, or reinforcement member that includes a die-cut expandable material.

BACKGROUND

The transportation industry continues to require methods of baffling, reinforcement and sealing that provide improved functionality while simultaneously providing reduced weight and cost. Often, in an effort to reduce weight, expandable materials are utilized. The shape and relative rigidity of these materials in their green state often result in an inability to fill corners or any small cracks or seams within a cavity. To compensate, the thickness of the expandable material is often increased in an effort to overload the space adjacent any hard to reach cavity to force material into the corners, cracks or seams during expansion of the expandable material. This practice not only increases cost, but may reduce performance of the expandable material in that the increase in the amount of material can cause blocked openings and uncontrolled expansion. There is thus a need for a method of sealing a cavity or multiple cavities to fill corners or any small cracks or seams without requiring the addition of thickness to the expandable material.

SUMMARY OF THE INVENTION

In a first aspect, the present invention contemplates a method for sealing a cavity comprising providing a substantially planar sealing body including a first expandable material layer of constant thickness having at least one cut-out portion in the material layer formed by cutting at least one portion of the expandable material so that a connected end of the material is still connected to the material layer and another end of the material layer is a free end. The sealing body may also include additional material layers which may also include cut-out portions that may or may not correspond with the cut-out portions of the first expandable material layer. The method may further include locating the sealing body within a cavity so that the free end of the one or more cut-outs extends into a portion of the cavity not occupied by any remaining material layer. The cavity optionally includes at least one wall that divides the cavity into a first area and second area so that the free end of the one or more cutouts extend into the first area of the cavity while the remaining expandable sealing body extends into the second area of the cavity. The method may include optionally providing one or more fasteners attached to or integrally formed with the expandable sealing body, wherein each of the one or more fasteners includes a first portion for attaching to a cavity wall and a second portion attached to the sealing body.

The method may further include forming an opening in the wall dividing the cavity so that the free end of the at least one cut-out enters the first area through the opening. The free end of the at least one cut-out may be located into a corner of the cavity. Two cut-outs may be formed, each extending into opposing corners of the cavity. The cut-out portions may be formed a die-cutting process. The fasteners may be located on the remaining material layer. The fasteners may be located on the one or more cut-outs. The remaining material layer may substantially surrounds the at least one cut-out.

The method may further include forming an opening in the at least one wall that divides the cavity into a first area and a second area and locating two free ends of the first expandable material layer through the opening and into the first area so that the entirety of the remaining material layer remains in the second area. The sealing body is substantially rectangular in shape. The cut-out portion is substantially rectangular in shape. The connected end of the cut-out portion is located equidistant from and in between two free ends. The connected end may be located adjacent or within the opening in the at least one wall during use of the sealing body. The connected end may be connected to the remaining first material layer in at least one location. The connected end may be connected to the remaining first material layer in at least two locations. The cut-out portion may include only one free end which is located in opposing relationship with a connected end.

The invention herein contemplates a device and method for the sealing of cavities with an expandable sealing body including one or more cut-outs for locating into areas of cavities to be sealed. The expandable sealing body disclosed herein may allow for effective baffling and/or sealing of a cavity with a lightweight composite structure that fills corners, gaps and seams of cavities without requiring additional thickness to be added to the expandable material.

DETAILED DESCRIPTION

The present invention allows for improved baffling, reinforcement, and/or sealing of a cavity with a lightweight sealing body, at least a portion of which may be an expandable material layer. The expandable material layer disclosed herein may include one or more cut-outs. The one or more cut-outs in the material layer cut at least one portion of the expandable material so that a connected end of the material is still connected to the material layer and another end is a free end. The remaining material layer may substantially surround the at least one cut-out. The free end may extend into a portion of a cavity where the remaining material is not present. For example, the free end may be inserted through an opening in a dividing wall of the cavity to fill the space of a first end of the cavity upon expansion while the remaining material fills a second end of the cavity upon expansion. In another example, the free end may be located in a corner of a cavity or at least two free ends may extend into opposing corners of the cavity. The expandable sealing body may also include one or more fasteners for attaching the expandable sealing body to a cavity wall.

Figure 1:
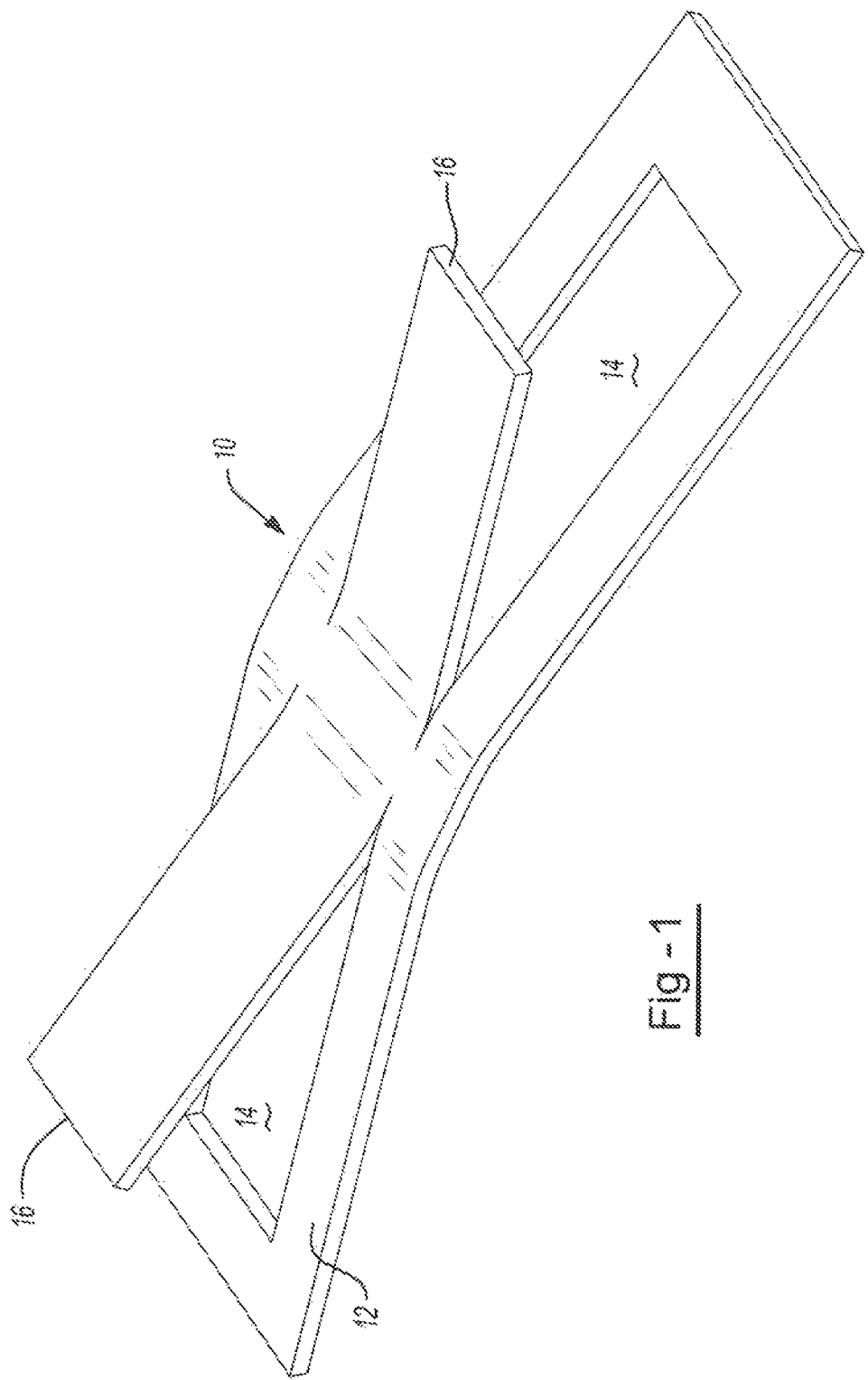
FIG. 1 shows a perspective view of an illustrative example of the expandable sealing body of the present invention.

FIG. 1 shows the expandable sealing body 10 which has a first expandable material layer 12 (shown prior to expansion). The sealing body 10 may be substantially planar, as shown, and may also have at least one cut-out 14 in the material layer, which may be cut by a die-cut process, so that a connected end of the material is still connected to the material layer 12 and another end is a free end 16. Additional material layers (not shown) may also be included as part of the sealing body 10. The additional material layers may be arranged in direct planar contact with the first expandable material layer. The additional material layers may also include cut-out portions that correspond with the cut-out portions of the first expandable material layer. The additional material layers may include cut-out portions that do not correspond with those of the first expandable material layer.

Figure 2:
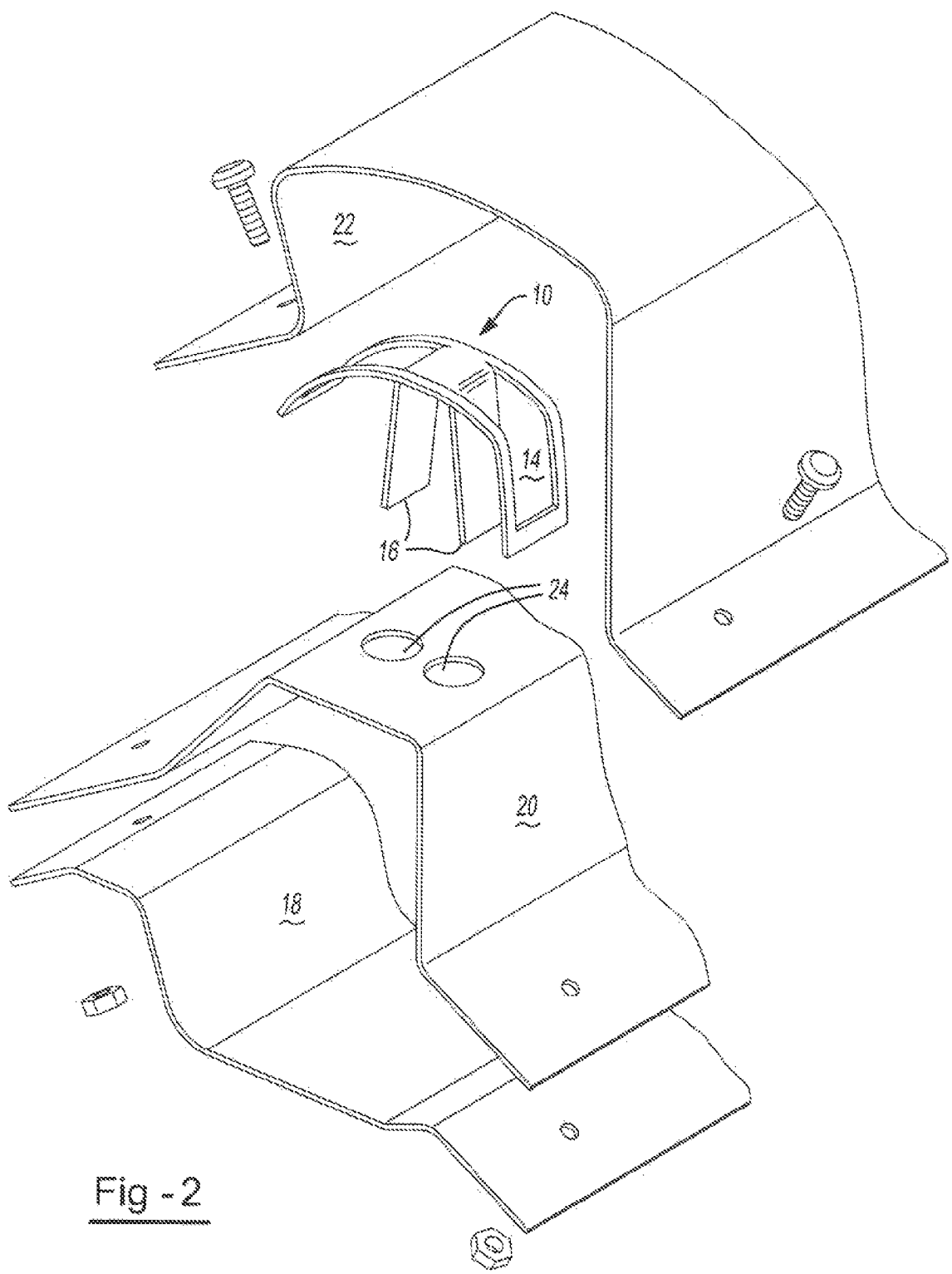
FIG. 2 shows an exploded view of the expandable sealing body of FIG. 1 located within a cavity prior to expansion of the expandable material.
Figure 3:
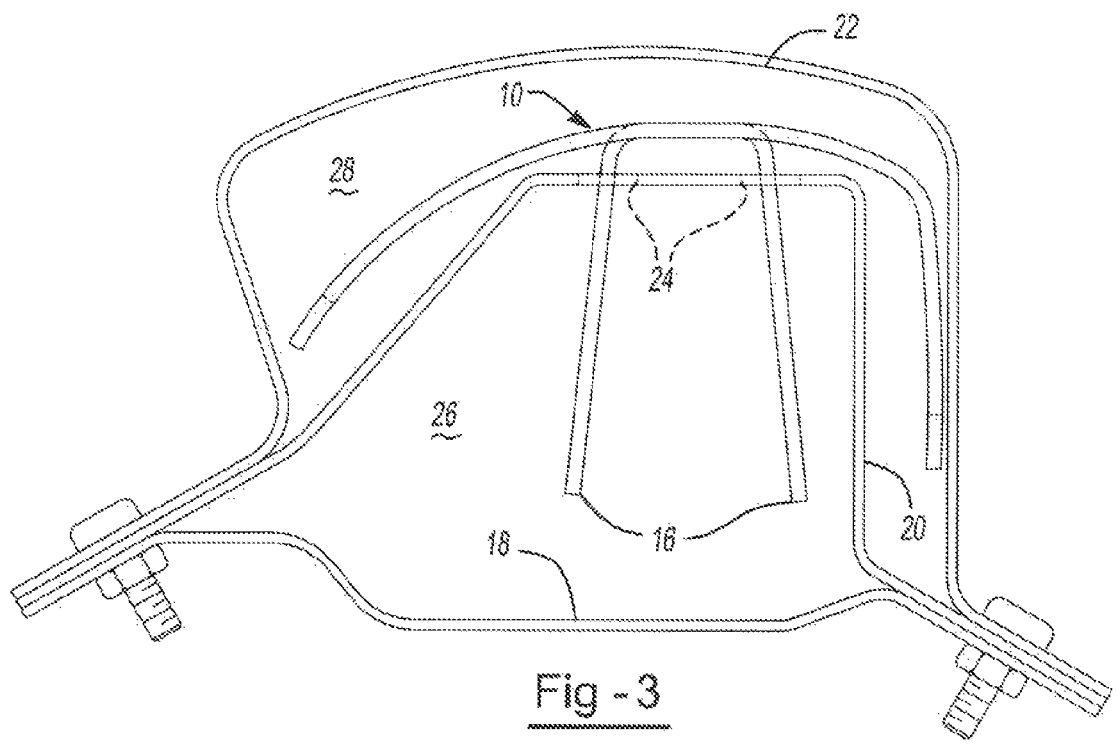
FIG. 3 shows the expandable sealing body of FIG. 1 located within a cavity prior to expansion of the expandable material.

FIG. 2 shows an exploded view of the cavity and the expandable sealing body 10. The cavity is formed by an inner wall of a first area of the cavity 18 and an inner wall of a second area of the cavity 22. There may be at least one dividing wall of the cavity 20, separating the cavity into at least a first area 26 and a second area 28, as shown in FIG. 3. The dividing wall of the cavity 20 may have at least one opening 24 to receive the free end 16 of the expandable material formed by the one or more cut-outs 14 in the material layer.

Figure 4:
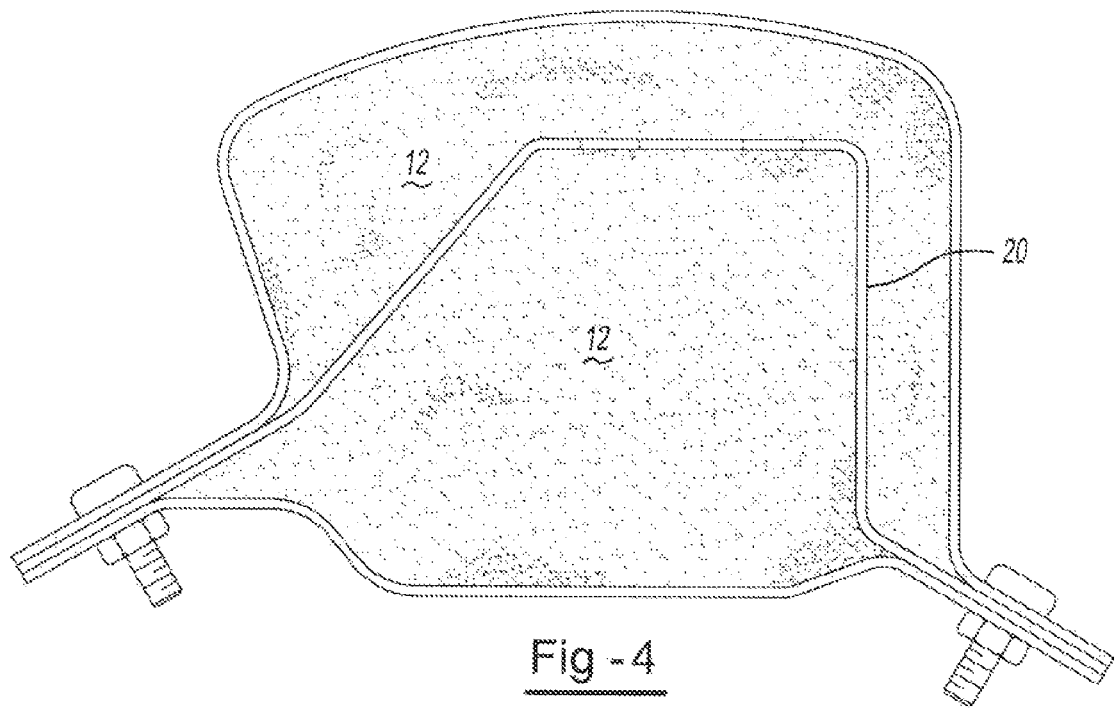
FIG. 4 shows the expandable sealing body of FIG. 1 located within a cavity after expansion of the expandable material.

FIG. 3 shows an embodiment of the present invention where the cavity is created by the inner wall of the first cavity 18, the inner wall of the second cavity 22, and the dividing wall of the cavity 20. These walls form a first area of the cavity 26 and a second area of the cavity 28. The free ends 16 of the expandable material layer 12 are inserted into the openings 24 in the dividing wall 20 so that, upon expansion, both the first area and the second area are filled and sealed using a single expandable sealing body 10. FIG. 4 shows the expandable sealing body 10 of FIG. 3 after expansion of the expandable material 12 to fill both the first area and the second area of the cavity.

The size of the sealing body may depend upon the size of the cavity in which the expandable sealing body is located, but it may be of a constant thickness or a variable thickness. The thickness of the sealing body may be at least about 0.1 mm. The thickness of the sealing body may be less than about 10 mm. The thickness of the sealing body may be from about 0.5 mm to about 6 mm. The first expandable material layer may be of a constant thickness. The thickness of the first expandable material layer may be less than the thickness of the sealing body. The thickness of the first expandable material layer may be equal to the thickness of the sealing body. The thickness of the first expandable material layer may be at least about 0.01 mm. The thickness of the first expandable material layer may be less than about 8 mm. The thickness of the first expandable material layer may be from about 0.2 mm to about 5 mm.

After placement of the sealing body into a cavity, the expandable material may expand according to a predetermined set of conditions. For example, exposure to certain levels of heat may cause the expandable material to expand. FIG. 4 illustrates an example of the expansion characteristics of the expandable sealing body. The volumetric expansion of the expandable material may vary depending upon the sealing and/or baffling needs of a particular cavity. The expandable sealing body may expand at least about 100%. The expandable material may expand less than about 2000%. The expandable material may expand at least about 500%, at least about 1000%, or more. The expandable material may expand less than about 1000% or even less than about 500%.

The sealing body may include a first expandable material and may also include additional material layers, one or more of which may also be formed of expandable materials. These expandable materials may be generally dry to the touch or tacky and may be shaped in any form of desired pattern, placement, or thickness, but is preferably of substantially uniform thickness. Though other heat-activated materials are possible for the expandable sealing body, a preferred heat activated material is an expandable polymer or plastic, and preferably one that is foamable. Any expandable material layers (including the first expandable material layer) may be a relatively high expansion foam having a polymeric formulation that includes one or more of an epoxy resin, an acetate (e.g. ethylene vinyl acetate), a thermoplastic polyether, an acrylate and/or a methacrylate (e.g., a copolymer of butyl acrylate and methyl acrylate), an epoxy/elastomer adduct, and one or more fillers (e.g., a clay filler, and/or a nanoparticle-containing filler). Preferred thermally expandable materials are disclosed in U.S. Pat. Nos. 7,313,865; 7,125,461; and 7,199,165 incorporated by reference herein for all purposes. For example, and without limitation, the foam may also be an EVA/rubber based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Suitable expandable materials include those available from L&L Products, Inc. under the designations L7220, L2821, L1066, L205, L2010, L2105, L2108A, L2806, L2811, L4200, L4141, L4161. L4315, L5510, L5520, L5540, L5600, L5601, L7102, and L7104. Any expandable material layers may be a material capable of being severed by a die cutting process.

A number of baffling or sealing foams may also be used to form at least a portion of the sealing body. A typical foam includes a polymeric base material, such as one or more ethylene-based polymers which, when compounded with appropriate ingredients (typically a blowing and curing agent), will expand and cure in a reliable and predictable manner upon the application of heat or the occurrence of a particular condition. From a chemical standpoint for a thermally-activated material, the foam is usually initially processed as a flowable material before curing, and upon curing, the material will typically cross-link making the material incapable of further flow.

The first expandable material layer (or any additional material layers) can be formed of other materials provided that the material selected is heat-activated or otherwise activated by an ambient condition (e.g. moisture, pressure, time or the like) and cures under appropriate conditions for the selected application. One such material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type alpha-olefin, phenol/formaldehyde materials, phenoxy materials, and polyurethane materials with high glass transition temperatures. Additional materials may also be used such as those disclosed in U.S. Pat. Nos. 5,766,719; 5,755,486; 5,575,526; and 5,932,680, incorporated by reference herein for all purposes.

In applications where the expandable material is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the material is processed along with the automobile structures at elevated temperatures or at higher applied energy levels, e.g., during coating (e.g., e-coat, paint or clearcoat) curing steps. While temperatures encountered in an automobile assembly operation may be in the range of about 148.89° C. to 204.44° C. (about 300° F. to 400° F.), for body shop applications (e.g., e-coat) and for paint shop applications, temperatures are commonly about 93.33° C. (about 200° F.) or slightly higher (e.g., 120° C.-150° C.).

The sealing body may be mechanically attached to a cavity wall via one or more fasteners. The sealing body may include a fastener such as a tree-fastener or a threaded screw fastener. The fastener may also be provided in a variety of shapes and in a variety of configurations so long as it can secure the expandable sealing body to a cavity. One example of a suitable fastener is disclosed in U.S. Publication No. 2010/0021267 incorporated by reference herein for all purposes. The fastener may be capable of securing multiple layers or types of materials to a structure. Examples of suitable fasteners include mechanical fasteners, clips, tabs, press-fits, snap-fits, screws, hooks, combinations thereof or the like. Furthermore, it is contemplated that the one or more fasteners may be formed integral of a singular material with the material of the expandable sealing body or may be formed of a different material and may be removably attached to the carrier. The fastener may be provided as a magnetic material or an adhesive material that can attach (e.g., adhere or magnetically secure) the expandable sealing body to a cavity. In such an embodiment, the magnetic material or the adhesive material may be interspersed within the first material layer or the expandable sealing body. Alternatively, the magnetic material or the adhesive material may be disposed upon the first material layer and/or the expandable sealing body or may be otherwise connected to the first material layer and/or the expandable sealing body.

The fastener may be attached to the at least one cut-out or attached to the remaining material layer. The sealing body may be installed so that the one or more fasteners contact a vehicle cavity wall. The fastening may occur so that the sealing body is rotated upon placement within a vehicle cavity. The fastening may also occur so that the one or more fasteners are pressed into an aperture for receiving the fastener within the cavity wall so that no additional step of movement or rotation is required for installation.

The sealing body may be located into a cavity having one or more walls that separate the cavity into multiple portions. The sealing body may be located into the cavity so that the free ends are located into one portion of the cavity and the remaining material layer is located into another portion of the cavity. The expandable sealing body may be located so that each free end and each remaining material layer is located into a different cavity portion. A free end of the expandable sealing body may also be located into a corner of a cavity.

The sealing body of the present invention may be installed into an automotive vehicle although it may be employed for other articles of manufacture such as boats, buildings, furniture, storage containers or the like. The sealing body may be used to seal and/or baffle a variety of components of an automotive vehicle including, without limitation, body components (e.g., panels), frame components (e.g., hydroformed tubes), pillar structures (e.g., A, B, C or D-pillars), bumpers, roofs, bulkheads, instrument panels, wheel wells, floor pans, door beams, hem flanges, vehicle beltline applications, doors, door sills, rockers, decklids, hoods or the like of the automotive vehicle.

The sealing body may also include an adhesive layer that comprises an outer surface of the expandable sealing body. The sealing body may include a plurality of sides with varying lengths, the lengths of some sides being substantially longer than the lengths of other sides. The sealing body, the cut-outs, or both may be substantially rectangular in shape. The sealing body, the cut-outs, or both may include one or more curved edges. The sealing body, the cut-outs or both may be substantially rounded in shape.

The sealing body may also include a film layer, such as that disclosed in U.S. Patent Publication Nos. 2004/0076831 and 2005/0260399, incorporated by reference herein for all purposes. The film layer may be used to cover a material that is tacky to the touch. The film layer may be removed from the material prior to application of the material to a vehicle structure, such that the film will reveal a tacky surface of the material that will adhere to the structure.

The materials and formation process of the present invention create a simplified lightweight sealing, reinforcement, and baffling device that can be easily customized to fit any cavity. The die-cutting process can produce a sealing body and cut-outs to fit a shape of any cavity.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "x parts by weight of the resulting polymeric blend composition" also contemplates a teaching of ranges of same recited amount of "x" in percent by weight of the resulting polymeric blend composition.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A method for sealing a cavity comprising:
   a. providing a substantially planar sealing body including:
      i. a first expandable material layer of constant thickness;
      ii. at least one cut-out portion in the first expandable material layer formed by cutting at least one portion of the first expandable material layer so that a connected end of the material layer is still connected to a remaining material layer and another end is a free end;
   b. locating the sealing body within the cavity so that the free end of the at least one cut-out portion extends into a portion of the cavity not occupied by the remaining material layer;
   wherein the cavity includes at least one wall that divides the cavity into a first area and second area so that the free end of the at least one cut-out portion extends into the first area of the cavity while the remaining material layer extends into the second area of the cavity; and
   wherein the remaining material layer substantially surrounds the at least one cut-out portion.

2. The method of claim 1, including forming an opening in the at least one wall dividing the cavity so that the free end of the at least one cut-out portion enters the first area through the opening.

3. The method of claim 1, wherein the free end of the at least one cut-out portion is located into a corner of the cavity.

4. The method of claim 1, wherein two cut-outs are formed, each extending into opposing corners of the cavity.

5. The method of claim 1, wherein the cutting is a die-cutting process.

6. The method of claim 1, wherein one or more fasteners are located on the remaining material layer.

7. The method of claim 1, wherein one or more fasteners are located on the one or more cut-out portions.

8. The method of claim 1, including:
   i. forming an opening in the at least one wall that divides the cavity into the first area and the second area;
   ii. locating two free ends of the first expandable material layer through the opening and into the first area so that the entirety of the remaining material layer remains in the second area.

9. The method of claim 1, wherein the sealing body is substantially rectangular in shape.

10. The method of claim wherein the cut-out portion is substantially rectangular in shape.

11. The method of claim 1, wherein the connected end of the cut-out portion is located equidistant from and in between two free ends.

12. The method of claim 1, wherein the connected end is located adjacent or within an opening in the at least one wall during use of the sealing body.

13. The method of claim 1, wherein the connected end is connected to the remaining material layer in at least one location.

14. The method of claim 1, wherein the connected end is connected to the remaining material layer in at least two locations.

15. The method of claim 1, wherein the cut-out portion includes only one free end which is located in opposing relationship with a connected end.

16. A method for sealing a cavity comprising:
   a. providing a substantially planar sealing body including:
      i. a first expandable material layer of constant thickness;
      ii. at least one cut-out portion in the first expandable material layer formed by cutting at least one portion of the expandable material so that a connected end of the material is still connected to a remaining material layer and another end is a free end and the remaining material layer substantially surrounds the cut-out portion;
   b. locating the sealing body within the cavity so that two free ends of the at least one cut-out extends into a portion of the cavity not occupied by the remaining material layer;
   wherein the cavity includes at least one wall that divides the cavity into a first area and second area so that the free end of the one or more cutouts extend into the first area of the cavity while the remaining material layer extends into the second area of the cavity and the connected end is located adjacent the at least one wall that divides the cavity.

17. The method of claim 16, wherein the cut-out portion includes only one free end which is located in opposing relationship with a connected end.

18. The method of claim 16, wherein the connected end is connected to the remaining first material layer in at least two locations.

19. The method of claim 16, wherein the connected end of the cut-out portion is located equidistant from and in between two free ends.

20. The method of claim 1, wherein each free end and the remaining material layer are located in different portions of the cavity.

* * * * *